Figure 1:
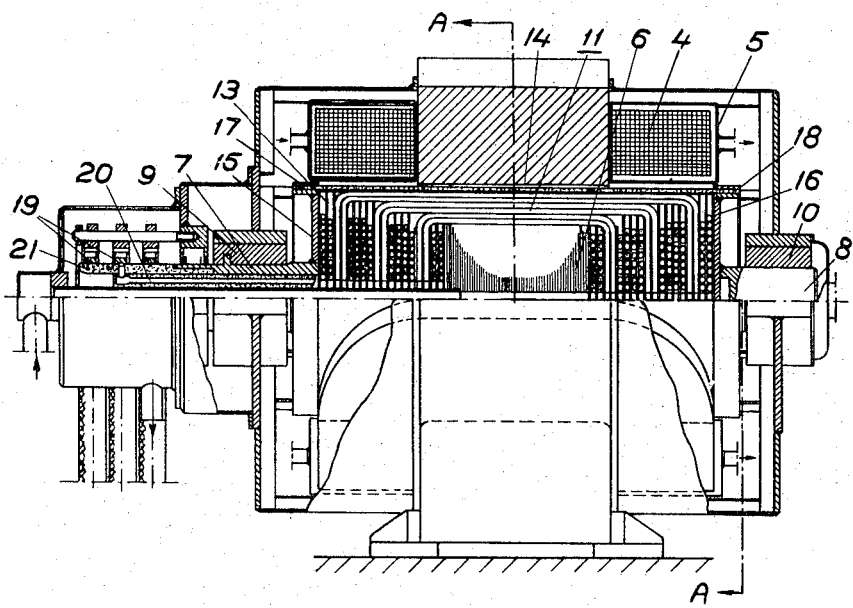

Jan. 30, 1968  K. D. MADSEN  3,366,813
ROTATING ELECTRICAL MACHINE, PREFERABLY HIGH POWER MACHINE
Filed July 20, 1964  5 Sheets-Sheet 4

INVENTOR.
KRISTIAN DAHL MADSEN
BY Bailey, Stephens &
Huettig

INVENTOR.
KRISTIAN DAHL MADSEN
BY Bailey, Stephens &
Huettig

# United States Patent Office 3,366,813
Patented Jan. 30, 1968

3,366,813
ROTATING ELECTRICAL MACHINE, PREFERABLY HIGH POWER MACHINE
Kristian Dahl Madsen, Vasteras, Sweden, assignor to Allmänna Svenska Elektriska Aktiebolaget, Vasteras, Sweden, a corporation of Sweden
Filed July 20, 1964, Ser. No. 383,848
Claims priority, application Sweden, Aug. 16, 1963, 8,971/63; Dec. 31, 1963, 14,613/63
12 Claims. (Cl. 310—262)

The present invention relates to a rotating electrical machine where the armature winding is arranged on a rotor which is substantially constructed as a slotless drum armature. Such machines have been known since the end of the nineteenth century, when they more or less dominated the field, but at the turn of the century they were succeeded by electrical machines manufactured according to the present day principle, that is with armature windings arranged in axial winding slots.

It is thought that there were very good reasons for leaving the slotless armature as a past stage of development. Thus it seemed obvious that a machine with a slotted armature was to be preferred because of the relatively small effect of the air gap which made it possible to effect a considerable reduction in the dimensions of the field system. Further, the slots solved the problem of obtaining a reliable mechanical power transmission between the iron core of the armature and the active conductors arranged on this core.

Recently, however, it has been found that certain special machines may advantageously be constructed having slotless armatures. It is thus known to make certain turbo-generators of otherwise conventional construction with armature windings completely embedded in a hollow cylinder rigidly mounted on the stator and surrounding the rotor, said cylinder being of insulating material and in its entirety arranged radially inside the air gap surface of the stator. The hollow cylinder is held in place on the stator with the aid, among other things, of axial slots in the stator, which do not, however, constitute winding slots in the usual sense. Said known machine is intended for cases where for reasons of stability it is necessary to make the machine with very large air gaps.

Further, a DC servo-motor has recently been put on the market the rotor of which is constructed as a slotless drum armature. Since the known motor is dimensioned with an average air gap induction of up to 1.7 Tesla, an extremely low moment of inertia has been achieved. Since the known servo-motor is intended for powers of less than 60 kw. and since also it is operated with, under other circumstances, an abnormally large proportion between the rotor length and the rotor diameter, the centrifugal forces operating on the armature winding do not cause any great problem. The winding is impregnated in epoxy resin so that winding, insulation and binder together form a stiff unit parcel firmly cast onto the rotor core. The centrifugal forces will not be so great as to make the mechanical connection between winding and rotor core incapable of transferring the motor moment from winding to shaft. However, the known construction has the drawback that its usefulness, at least with high revolution rates, is limited to machines having relatively small rotor diameter.

It has also been proposed to make AC high power machines according to the outer pole principle and for that purpose to use superconducting field windings. According to the known proposal the rotor winding would be cast in a plastic material and together with this form a solid package rigidly arranged on the shaft. The forces transferred from the winding to the shaft would then be directly transferred from said package to that part of the shaft surrounded by the package. Apart from the fact that said power transmission would be extremely difficult with a super-conducting machine according to the known proposal, such a construction has the disadvantage that the radial dimensions of the rotor, and therefore those of the stator, would to a great extent be influenced by the relatively large diameter of the shaft.

One condition for the use of a slotless rotor as armature even with great power and high revolution rate is that it is possible to effect a sufficiently steady mechanical connection between the winding and the shaft end under such conditons. With a machine according to the invention the problem has been solved by transferring at least part of the forces operating between the rotor winding and the shaft end by means of a hollow cylinder surrounding the rotor winding and rigidly connected to the shaft ends of the rotor axially outside the rotor core, said cylinder being arranged in the air gap. In this way the centrifugal forces are utilized as a positive factor for the mechanical power transmission and since the shaft part running through the rotor core can be reduced in thickness or completely eliminated, several other important advantages are obtained which will be discussed in more detail later. The invention relates to a rotating electric machine, preferably intended for a power of more than 100 kw., containing a stator with a field winding and a rotor with a rotor core surrounded by an armature winding, which rotor is substantially formed as a slotless drum armature, and characterised in that the rotor is enclosed in a hollow cylinder which is rigidly joined to the shaft ends of the rotor by means of members arranged axially outside the rotor core, while said cylinder is preferably made of non-magnetic material with high specific electrical resistance and is arranged to exercise a radial pressure on the rotor winding and thus transfer a considerable portion of the operating forces between at least one shaft end and the armature winding, through at least one of said members.

Figure 2:
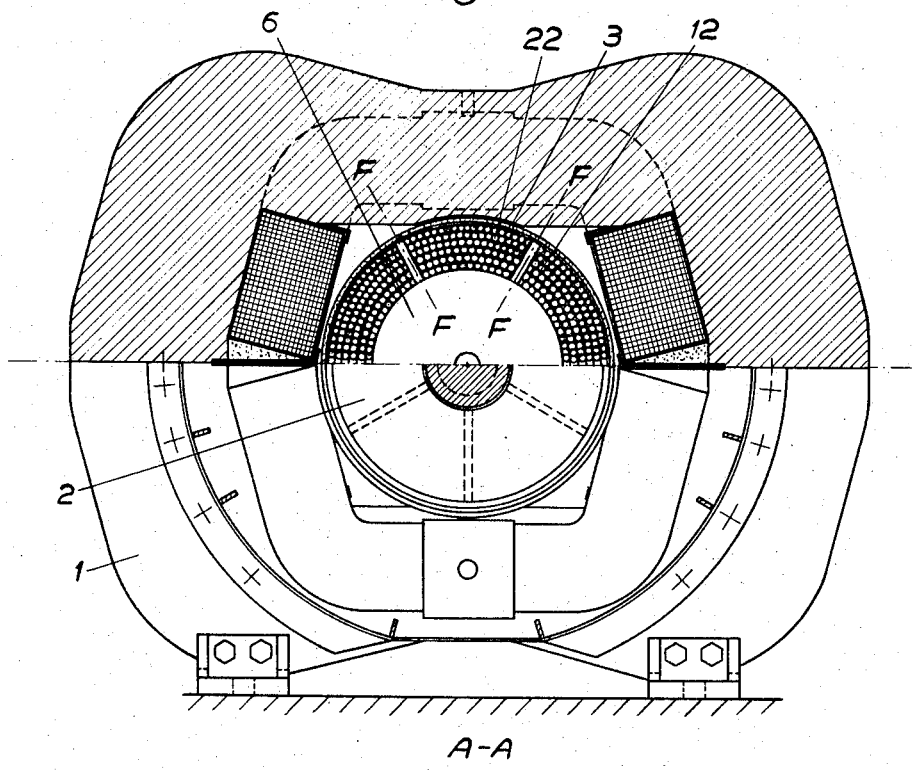
Figure 3:
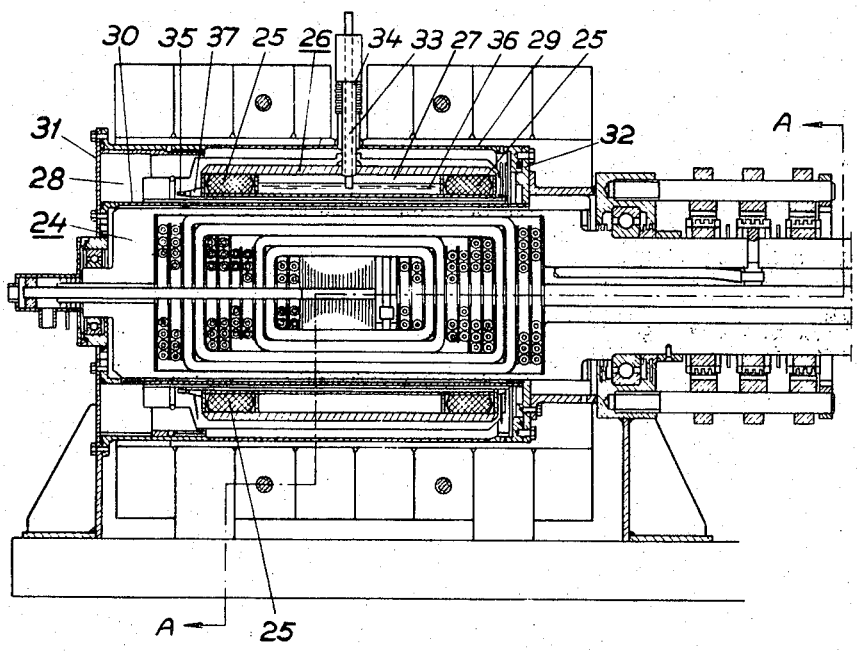
Figure 4:
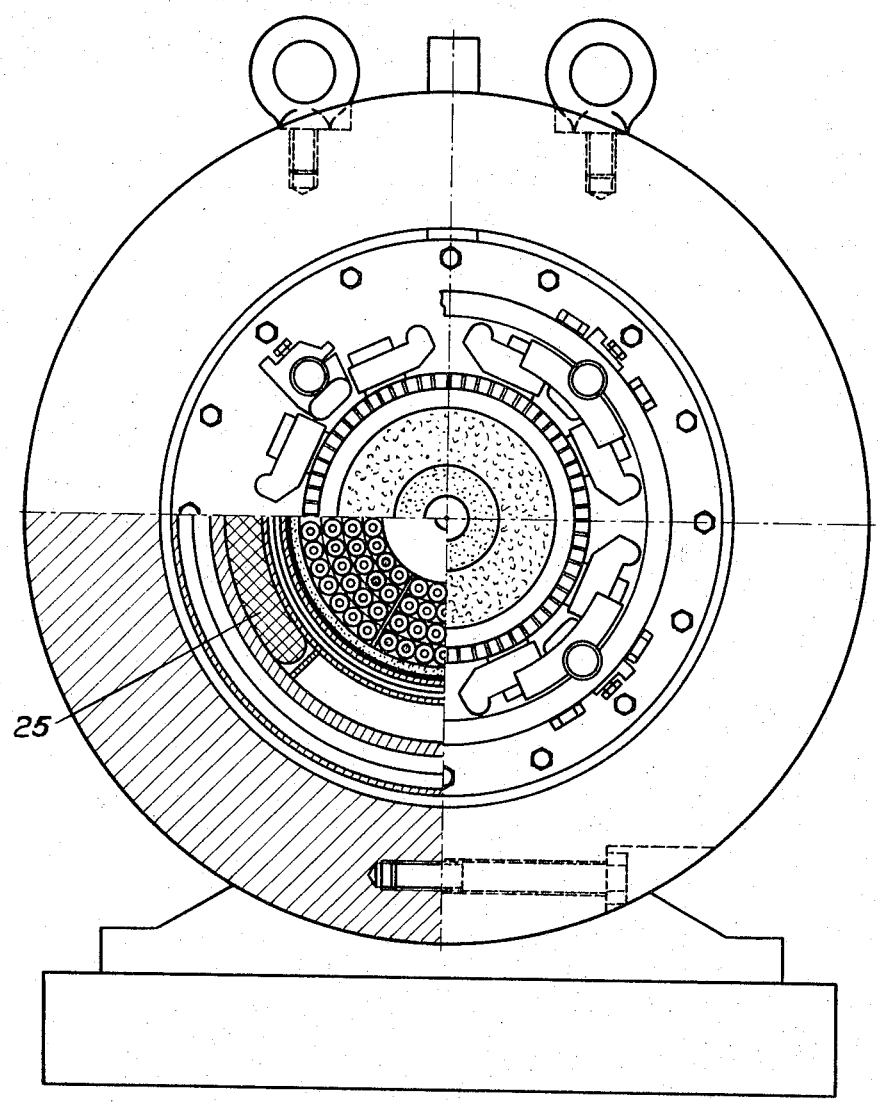
Figure 5:
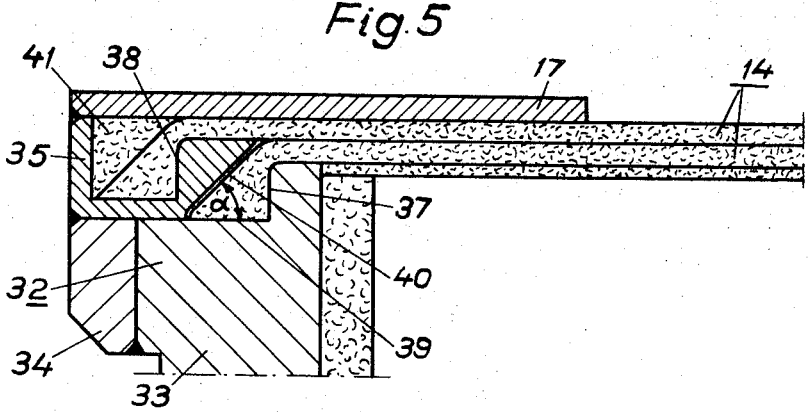
Figure 6:
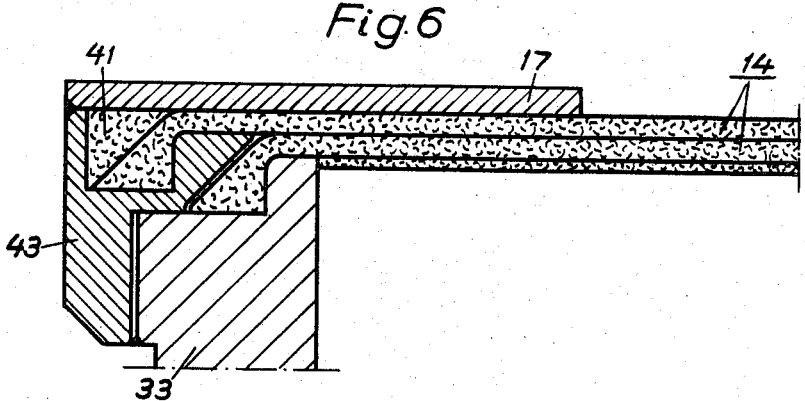
Figure 7:
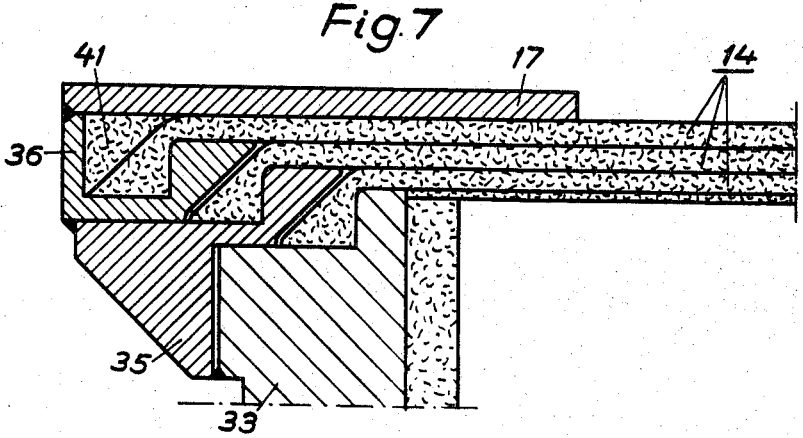

In the following the invention will be described with reference to the accompanying drawing where FIGURE 1 shows a machine, partly in side view, partly in section through the longitudinal axis, and FIGURE 2 shows a cross-section along A—A in FIGURE 1. An embodiment with super-conducting magnetization system is shown in FIGURES 3 and 4, where FIGURE 3 shows an axial section and FIGURE 4 shows a cross-sectional perpendicular to the axis. FIGURES 5, 6 and 7 show in axial cross-section three different embodiments of a detail of the cylinder and the mechanical connection between the cylinder and a flange surrounded by it.

In the drawing 1 designates the stator and 2 the rotor of the machine. The stator is provided with a two-pole field system, each of the poles being formed with an air-gap surface facing the rotor. The winding of the field system consists of a saddle-shaped coil 4 for each pole. The coil 4 is surrounded by a casing 5 to lead coolant through the coil. The iron core 6 of the rotor has no slots in the air gap surface and is made of laminated magnetic material and provided with a central axial channel intended for circulation of the coolant. The core 6 has no through-running shaft and no direct mechanical connection at all with the shaft ends or stub shafts 7 and 8 which are arranged, each in its own bearing 9 and 10 rigidly mounted in the stator. The armature winding 11 of the machine is wound onto the rotor and constructed as a Y-connected three-phase winding. The broken lines F—F in FIGURE 2 denote a rotor sector within which one half of the active rotor conductors for one of the three phase windings lies. The other half, not shown in the figure, lies diametrically opposite. The active conductors in a phase winding are arranged in conductor layers lying radially one outside the other and insulated from each other by means of intermediate insulating layers 12. All conductors in a conductor layer lie beside each other peripherally, and radially successive layers form winding parts which succeed each other in the same order as in the winding diagram. Thus the neutral point is in the innermost conductor layer and the end point of the winding phase in the outermost. This arrangement is advantageous from the point of view of insulation since the conductor insulation need only be dimensioned for partial voltage between layers lying peripherally next to each other, which partial voltage, for example for a machine according to FIGURE 1 and FIGURE 2, comprises approximately one percent of the phase voltage. The insulating layer 12 also need only be dimensioned to take care of part of the phase voltage, and the insulation layer arranged peripherally between the innermost conductor layer and the rotor iron is subjected under normal operating conditons to a voltage which in the machine shown is less than one sixth of the phase voltage. Along the lines F—F and other border layers between the phase winding, however, layers of insulation, not shown in the figure, must be inserted, which can withstand maximum line voltage. The total area of these walls is, however, very small in comparison with the insulating layers and said walls therefore have a relatively small influence on the copper space factor of the rotor winding which factor, because of the favourable insulating conditions, will be considerably greater than in conventional synchronous armatures. The winding is wound onto the rotor core in such a way that the coil ends form layers having conductor thickness, arranged in an axial direction axially outside the rotor core. The layers are insulated from each other by means of insulating discs 13 arranged in radial planes and each layer comprises coil ends for a corresponding layer of active conductors in a phase winding. The insulation discs 13 are made with a thickness increasing axially outwards. The layers are arranged so that the different winding phases, which may be indicated by R, S, T, succeed each other in the axial direction in the order R, S, T, T, S, R, R, S, T, etc. In this way a good balance is obtained between the phase windings with regard to resistance and inductance.

As mentioned the driving force between the shaft end and the winding is not transferred through the rotor core. On the contrary, the transfer takes place through a hollow cylinder 14 surrounding the rotor winding and arranged in the air gap, said cylinder being rigidly connected to the shaft ends by means of the flanges 15 and 16 which exert axial pressure on the winding.

The cylinder 14 is constructed of glass-fibre reinforced plastic and contains pre-stressed glass fibres running substantially peripherally of the cylinder. The pre-stress force on the fibres is greater than those forces to which the fibres could be subjected due to centrifugal force. The pre-stressing improves the mechanical connection between the cylinder and the flanges. In addition the mechanical connection between the cylinder 14 and the flanges 15 and 16 is strengthened by means of steel rings 17 and 18 which are shrunk onto the cylinder 14 and thus enclose the flanges. The cylinder 14 is provided on the outside with a conducting layer, not shown in the figure, electrically connected to the flanges and having high specific resistance, in order to prevent corona arising between the cylinder 14 and the air gap surface 3 of the coil. The rotor winding in its entirety is vacuum-impregnated with a plastic material so that a rigid connection is obtained between the conductors and between the conductors and insulating layer. The end points of the Y-conected winding phases are connected, each with a slip-ring 19 by means of insulated conductors 20 arranged in the shaft. The slip-rings are arranged on a hollow extension 21 of the rotor shaft, made of insulating material.

In a machine with a super-conducting field winding in the stator a construction according to the invention is particularly suitable since the forces operating between the shaft end and the rotor winding are extremely great. A super-conducting machine constructed according to the invention is shown in FIGURES 3 and 4. The stator is provided with a super-conducting field winding 25. The rotor 24 is constructed in substantially the same manner as the machine shown in FIGURES 1 and 2, but instead of a cylinder with separately manufactured flanges and shaft ends a body is used manufactured in one piece of glass-fibre laminated epoxy resin.

The machine described with reference to FIGURES 1 and 2 comprises only one of several possible embodiments of the invention. Thus, for example, the cylinder 14 may be constructed in several different ways. It may be entirely constructed of a non-magnetic alloy with high specific resistance or it may consist of glass-fibre laminated plastic or of metal wires furnished with an adhesive plastic coating. It may be advisable to make the cylinder in the form of a bandage arranged on the rotor, of non-magnetic flexible material preferably of high specific resistance and with rectangular cross-section in order to obtain a good space factor. If the thread is conducting, it is provided with insulation or in some other way axial currents are prevented from arising, for example by placing the different turns at a sufficient axial distance from each other. Those parts of the cylinder 14 which lie axially outside the stator poles may also each be provided with a reinforcement in the form of a surrounding steel cylinder, for example by giving the steel rings 17 and 18 a width which corresponds to the axial length of these parts. Further, each of the rings 17 and 18 may be made with a ring-shaped part arranged axially outside the cylinder 14, said part, along its whole inner periphery, being soldered or welded together to one of the flanges 15 and 16 in order to obtain an extremely tight encasing of the rotor.

In FIGURES 5, 6 and 7, 14 designates the cylinder which is arranged to surround the armature core and armature winding, which are additionally enclosed between two flanges arranged axially outside the rotor core ends and the coil ends arranged axially outside these, respectively. In each of the figures only one of these flanges is shown, and is designated 32. The flange shown in FIGURE 5 is welded together from three different parts. Thus it contains a part 33 which is rigidly mechanically joined to the shaft end, not shown in the figure, and also a support ring 34 and an attaching ring 35. The flange part 33 is stepped to provide an attaching surface 37 and, perpendicular to this, a cylindrical surface 39 against which the inner side of the attaching ring 35 abuts. The attaching ring 35 is also provided with an attaching surface 38 perpendicular to the shaft. The flange 32 is surrounded by the cylinder 14 intended for power transmission between the armature winding and the shaft ends, which substantially consists of helical parts of a glass-fibre thread lying close to each other. The cylinder 14 consists of several helixes of flexible material wound immediately after each other. Each helix comprises successively: one part which is arranged axially outside an attaching surface on the flange 32, a first helical part, a part lying axially outside an attaching surface on the other flange, not shown in the figure, and a second helical part with opposite pitch direction in relation to the first. The lead of the flexible material is determined in such a way that one helix always contains a certain number of whole turns. Thus, on the completion of a helix a point is reached which differs only in the thickness of the flexible material from the position of the starting point, and thus an immediately subsequent helix will lie close to the previous one. At the start the flexible material is placed so that it is kept in position by the attaching surface 37 on one flange and a corresponding surface on the other flange, not shown in the figure. The helix to be wound first lies directly against the attaching surface and also touches the surface 39. These following helixes also touch the surface 39, but then at a greater distance from the surface 37 and the thread parts placed on the flange form a conical surface 40 which is set at an angle α in relation to the surface 39. At a certain size for the angle α the step consisting of the surfaces 37 and 39, on the flange part 33, can no longer securely hold the helical parts running between the flanges, since they are made with relatively large pitch and for this reason subsequent helixes are held by the attaching surface 38 on the attachment ring 35. The attaching ring 35 is provided with a conical surface facing axially inwards and intended to exert pressure on the flexible material parts situated in the step on the flange part 33 and thus give an additional security against displacement of these. For the remaining helixes, that is, those which the surface 37 cannot hold in position, the attaching surface 38 is used. When the cylinder is completely wound a number of filling bodies 41 is placed against the outside of the flexible material parts in the ring 35 and the separate parts of the flange 32 are welded together. A steel ring 17 arranged to surround cylinder parts lying axially outside the stator poles is welded to the flange 32. The embodiment shown in FIGURE 6 differs from that in FIGURE 5 in that a ring-shaped part 43 is used instead of the flange parts 34 and 35. In the embodiment of the invention shown in FIGURE 7 each flange is composed of three parts, of which parts 35 and 36 are attaching rings provided with individual attaching surfaces. Further, an attaching surface is made on the flange part 33.

A cylinder of the above described construction must, besides taking up centrifugal forces from the rotor winding, also transfer the turning moment of the machine from flange to rotor winding. Additionally, the cylinder must give a sufficient moment of resistance against bending out of the rotor, in order to obtain a high value of the critical speed and the cylinder must therefore also be able to withstand great axially directed tensions. This is achieved by winding the thread with a relatively large lead of the thread, for example with a helix angle of 30°. The optimum pitch varies from case to case according to the length, diameter, speed of rotation, etc., of the machine.

The cylinders 14 shown in FIGURES 5, 6, and 7 are manufactured from glass-fiber thread which is pre-impregnated by being passed through a bath of liquid epoxy resin during the winding process. Instead of glass-fiber thread other material may be used, for example thread of stainless steel. Due to the impregnation and to the special design of the flange 32 it is ensured that the cylinder is fluid-tight, which is of considerable importance when direct cooling of the rotor winding is to be used.

In FIGURES 1 and 2 each rotor conductor 22 is constructed as a bundle of several part-conductors insulated from each other where the insulation between the part-conductors is intended to reduce the eddy currents. Of course the rotor conductor may even be made up of several such insulated bundles of part-conductors which are held beside each other during the winding process and parallel-connected in the ends of the winding phases.

When super-conducting stator windings are used it is in certain cases advantageous to use a non-magnetic body instead of a magnetic rotor core. By rotor core is generally meant a body surrounded by the rotor winding.

As mentioned in the introduction, there are several advantages with a machine according to the invention in using an only relatively thin shaft through the rotor core, or—which is preferable in most cases—simply constructing the machine without any direct mechanical connection between the rotor core and shaft ends. Particularly when the rotor core is made entirely without a through-running shaft, a considerable reduction in rotor diameter is obtained, which also greatly influences the dimensions of the stator since the wall thickness of the cylinder 14 will be much less than the radius of a central shaft with the same capacity for transferring the turning moment. Further, calculations have shown that, with a cylinder thickness rather small in relation to the air gap and magnetically completely acceptable, a very high moment of resistance is obtained against bending out, which results in an unusually high critical revolution rate. Furthermore the positioning and insulation of the coil ends is simplified, among other things because the coil end turn region is not encumbered by the rotor shaft.

While the partial or entire replacement of a through-running rotor shaft by a hollow shaft in a machine according to the invention is desirable for reasons of power transmission, this also means a reduction in rotor diameter and therefore, particularly with normal conducting field windings, a very welcome reduction of the mechanical dimensions of the field system which it might be feared would be very large due to the large air gap.

I claim:

1. Rotating electrical machine comprising a stator with a field winding and a rotor with a rotor core and an armature winding wound on said rotor core, stub shafts journalled in the stator at each end of said rotor core, said rotor core being substantially formed as a slotless drum, the armature winding including substantially diametrically located axially extending winding parts and diametrically extending coil ends connecting said winding parts located axially outside the rotor core, said rotor further comprising a hollow cylinder enclosing said armature winding, members rigidly joining said hollow cylinder to the stub shafts, said members being arranged axially outside the end turn areas of said rotor core, said cylinder exercising a radially inward pressure on the armature winding so as to maintain a substantially fixed relationship between the hollow cylinder and the armature winding, whereby to transfer operating forces between at least one stub shaft and the armature winding through at least one of said members.

2. Electrical machine according to claim 1, said cylinder being constructed of reinforced plastic.

3. Electrical machine according to claim 1, said cylinder being constructed of glass-fiber reinforced resin, the tensile forces brought about by the pre-stressing and acting on the glass fibers being greater than the forces exerted on the fibers due to centrifugal influence at maximum revolution speed of the rotor.

4. Electrical machine according to claim 1, including a phase winding containing several conductor layers arranged radially in the air gap, the radial dimension of said air gap corresponding to the thickness of the conductors, each of said layers comprising a plurality of rotor conductors which constitute parts of successive winding turns in the current direction, and radially successive conductor layers comprising in the same sequence electrically joined series-connected parts of the phase winding.

5. Electrical machine according to claim 1, metallic flanges carried by said stub shaft surrounded by said cylinder comprising the members rigidly joining said cylinder to said stub shafts, and steel rings arranged axially outside the stator poles, said rings surrounding the flanges and said cylinder and exerting radial pressure on said cylinder.

6. Electrical machine according to claim 5, said flanges including means to exert a substantial axial pressure on the coil ends located axially outside the rotor core, so that part of the operating forces transferred between the rotor terminal and rotor conductor is transferred directly between the rotor winding and said flanges.

7. Electrical machine according to claim 5, said steel rings having a great enough axial width to surround an essential part of the parts of the armature winding arranged axially outside the air gap, and exerting a substantial radial pressure on the armature winding.

8. Electrical machine according to claim 5, said rings each comprising a ring-shaped part arranged axially outside said cylinder, said parts being rigidly welded each to its own flange by a ring-shaped welding seam.

9. In a rotating electrical machine according to claim 1, said stub shafts being arranged axially outside the rotor winding, said joining members comprising first and second flanges each of which is arranged on one of said stub shafts and is surrounded by the cylinder, the cylinder comprising at least one elongated member of non-magnetic material wound continuously around the magnetic core and the rotor winding, said elongated member forming a plurality of left-hand as well as a plurality of right-hand helical cylinder parts running between said flanges and engaging surfaces of said flanges which face axially outwards, the elongated member being wound with a plurality of substantially mutual congruent winding cycles succeeding each other along its length, each of said cycles comprising a part running on said first flange axially outside said surface, a first helical part, a part running axially outside said surface of said second flange, and a second helical part, said first and second helical parts being oppositely pitched in relation to each other.

10. Rotating electrical machine according to claim 9, said elongated member being electrically insulated and composed of stainless steel.

11. Rotating electrical machine according to claim 9, said elongated member being composed of fiberglass.

12. Electrical machine according to claim 9, said elongated member having a rectangular cross-section.

References Cited

UNITED STATES PATENTS

| | | | |
|---|---|---|---|
| 2,759,116 | 8/1956 | Glass | 310—43 |
| 2,919,359 | 12/1959 | Luenberger | 310—86 |
| 3,138,105 | 6/1964 | White | 310—86 |
| 3,151,262 | 9/1964 | Howard | 310—43 |
| 3,231,768 | 1/1966 | Dannenmann | 310—86 |
| 3,258,620 | 6/1966 | Imanuel | 310—86 |
| 2,642,920 | 6/1953 | Simon | 310—43 |
| 2,860,267 | 11/1958 | Hayes | 310—43 |

FOREIGN PATENTS 619,481  3/1949  Great Britain.

DAVID X. SLINEY, *Primary Examiner.*

L. L. SMITH, J. W. GIBBS, *Assistant Examiners.*